UNITED STATES PATENT OFFICE.

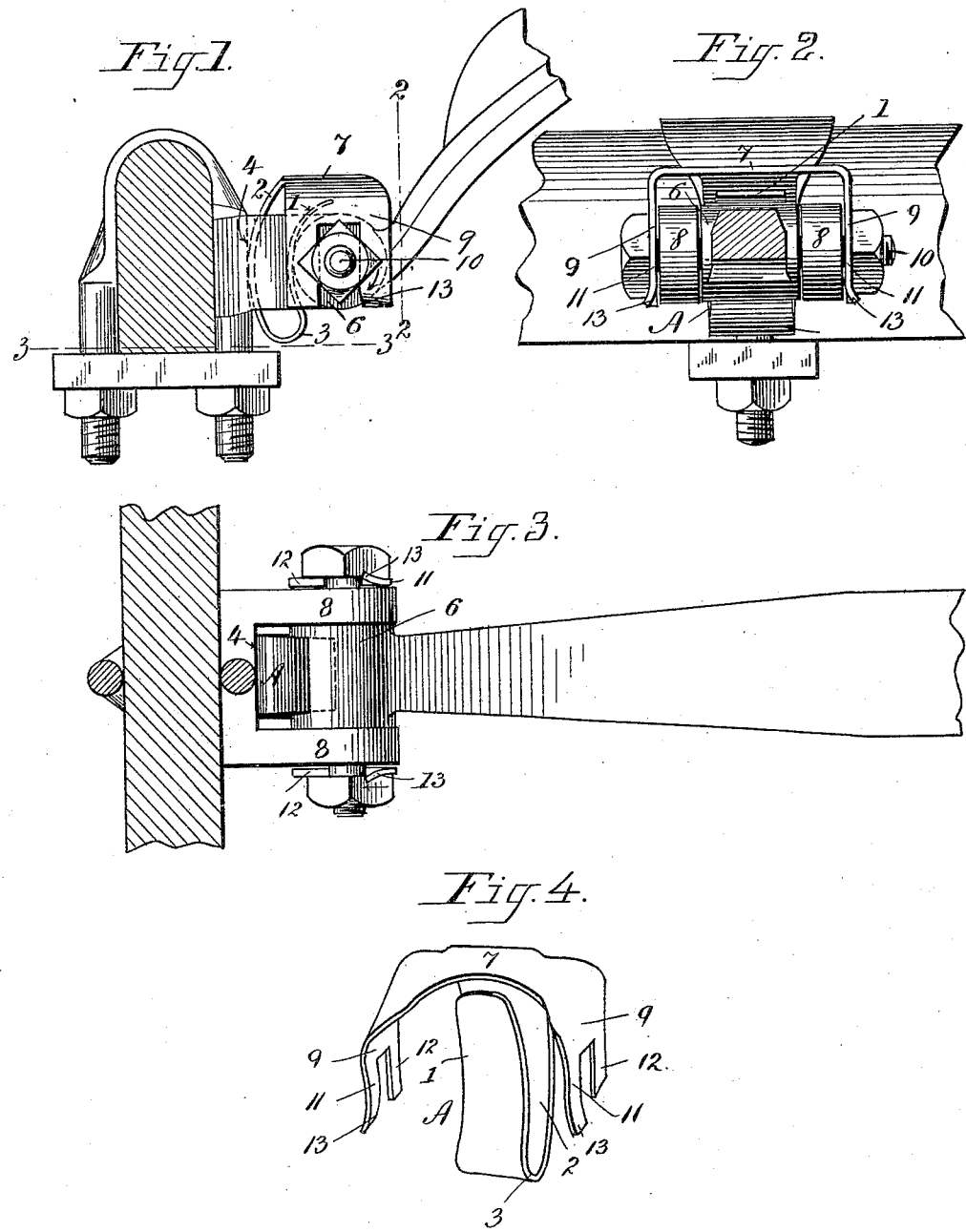

FRANK. N. KELSEY, OF FLORENCE, ASSIGNOR OF ONE-HALF TO GEORGE L. LOOMIS, OF NORTHAMPTON, MASSACHUSETTS.

THILL-COUPLING.

SPECIFICATION forming part of Letters Patent No. 449,367, dated March 31, 1891.

Application filed October 31, 1890. Serial No. 369,937. (No model.)

*To all whom it may concern:*

Be it known that I, FRANK. N. KELSEY, a citizen of the United States, residing at Florence, in the county of Hampshire and State of Massachusetts, have invented new and useful Improvements in Anti-Rattler Devices for Thill-Couplings, of which the following is a specification.

This invention relates to improvements in anti-rattler devices for thill-couplings, the object being to provide in and combine with the vibration preventing parts for application between the eye of the thill-iron and the front side of the clip, also supplementary portions for maintaining the above-named part in its working position, and also to prevent endwise movement or vibration of the thill-iron bolt, and to act as a lock for the nut applied upon said bolt.

The invention will be more fully and clearly understood on reference to the accompanying drawings and the following description and claims.

In the drawings, Figure 1 is a side elevation of the thill-coupling and anti-rattler applied thereon. Fig. 2 is a front elevation and vertical section, as seen to the rear of the plane, indicated by line 2 2, Fig. 1. Fig. 3 is a plan view of the said parts inverted, some thereof being shown in section, as indicated by the line 3 3, Fig. 1. Fig. 4 is a perspective view of the anti-rattler device shown as removed from the coupling.

The said anti-rattler device is composed of thin spring sheet or plate metal and comprises a tongue A, consisting of the two leaves 1 and 2, united by the return-bend 3, suitably separated and exerting a spring-reaction, the one away from the face of the other, and said spring-tongue is interposed between the front face 4 of the clip and the rear of the thill-iron eye 6. The leaf 2 of said spring-tongue at its upper end is formed integral with and is supported by a generally horizontal and transversely-extended section 7, which projects outwardly at each side into a plane about coincident with the outer sides of the clip-lugs 8 8, being downwardly extended, as seen at 9 9, and formed bifurcated to straddle the bolt 10, each of the legs 11 and 12, standing, respectively, to the front and rear of said bolt, and lying inside of the bolt-head and confining-nut, and, exerting an outward or distending reaction, they serve to hold the bolt against vibration longitudinally of its axis and also to bind the nut by its threads against the threads on the bolt.

The extremities 13 of the legs 11 are outwardly turned or curved, substantially as shown, all so that the nut on being turned in the direction of the short arrow in Fig. 1 may force the said upturned portion inwardly against the spring-reaction thereof until the corner of the nut has passed by the inner edge of said upturned portion, when the same will spring back, resuming its normal position, and will act as a click or detent, effectually preventing any backward turning and unloosening of the nut on the bolt.

The construction or formation of the anti-rattler and nut-locking device for a thill-coupling described is most simple and of easy production, and in consequence of the formation and arrangement of the parts described the said device is itself insured in its operative position, for it will be noted that the turned-up extremities of the legs 11 11 have also the functions of detaining the anti-rattler from unduly rising and becoming detached from the coupling.

Having fully described my invention, what I claim, and desire to secure by Letters Patent, is—

1. The combination, with a thill-coupling, of an anti-rattler device integrally formed from a single piece of thin metal comprising the tongue formed by the spring-reacting leaves 1 and 2, adapted to be inserted between the front of the clip and the eye of the thill-iron, and the portion 7, to which one of said leaves is connected, provided with the pending portions 9, having the legs 11 and 12, which have an outward spring-reaction and which straddle the coupling-bolt, substantially as described.

2. An anti-rattler device integrally formed from a single piece of thin metal and consisting of a tongue formed of spring-reacting leaves 1 and 2, and the portion 7, to which one of said leaves is connected, provided with the pending portions 9, having the legs 11 and 12, which have an outward spring-reaction, substantially as described.

3. An anti-rattler device comprising a tongue formed by spring-reacting leaves 1 and 2, the portion 7, to which one of said leaves is connected and which at each side is provided with the pending bifurcated portions 9, adapted to straddle the coupling-bolt, and one of the legs having the curved or upset extremity 13 to constitute a click or detent, substantially as and for the purpose described.

FRANK. N. KELSEY.

Witnesses:
WM. S. BELLOWS,
G. M. CHAMBERLAIN.